US010281731B2

United States Patent
Srivastava et al.

(10) Patent No.: US 10,281,731 B2
(45) Date of Patent: May 7, 2019

(54) 2D/3D SWITCHABLE LIQUID CRYSTAL LENS UNIT

(71) Applicant: The Hong Kong University of Science and Technology, Hong Kong (CN)

(72) Inventors: Abhishek Kumar Srivastava, Aishbagh Lucknow (IN); Vladimir Grigorievich Chigrinov, Hong Kong (CN); Hoi-Sing Kwok, Hong Kong (CN)

(73) Assignee: THE HONG KONG UNIVERSITY OF SCIENCE & TECHNOLOGY, Hong Kong (CN)

( * ) Notice: Subject to any disclaimer, the term of this patent is extended or adjusted under 35 U.S.C. 154(b) by 0 days.

(21) Appl. No.: 14/713,238

(22) Filed: May 15, 2015

(65) Prior Publication Data

US 2015/0331247 A1    Nov. 19, 2015

Related U.S. Application Data

(60) Provisional application No. 61/996,790, filed on May 16, 2014.

(51) Int. Cl.
*G02F 1/141* (2006.01)
*G02F 1/1335* (2006.01)
(Continued)

(52) U.S. Cl.
CPC ......... *G02B 27/2214* (2013.01); *G02B 27/26* (2013.01); *G02F 1/13306* (2013.01);
(Continued)

(58) Field of Classification Search
CPC .. G02B 27/2214; G02B 27/26; G02B 27/286; G02B 3/0037; G02B 5/3083;
(Continued)

(56) References Cited

U.S. PATENT DOCUMENTS 4,367,924 A * 1/1983 Clark ................. C09K 19/02
349/172
5,982,538 A * 11/1999 Shikama ............ H04N 13/0422
348/57
(Continued)

OTHER PUBLICATIONS

Jen, Tai-Hsiang, et al., "Partial 2D/3D Switchable Autostereoscopic Display Using Localizable Liquid Crystal Lens Array", *Proceedings of 3DSA2013*, pp. 5-3 (2013).
(Continued)

*Primary Examiner* — Thoi V Duong
(74) *Attorney, Agent, or Firm* — Leydig, Voit & Mayer, Ltd.

(57) ABSTRACT

A 2D/3D switchable liquid crystal lens device includes: a polarization-dependent lens array, configured to provide a focusing effect for impinging light having a first plane of polarization of the impinging light and to provide no focusing effect for impinging light have a second plane of polarization orthogonal to the first plane of polarization; a switchable polarization rotating stage, comprising bi-stable liquid crystals, wherein the switchable polarization rotating stage is configured to output light having the first plane of polarization to the polarization-dependent lens array while the bi-stable liquid crystals are in a first state, and to output light having the second plane of polarization to the polarization-dependent lens array while the bi-stable liquid crystals are in a second state; and a driving system, configured to switch the bi-stable liquid crystals of the switchable polarization rotating stage between the first state and the second state.

11 Claims, 10 Drawing Sheets

(51) Int. Cl.
*G02F 1/1333* (2006.01)
*G02B 27/22* (2018.01)
*G02B 27/26* (2006.01)
*G02F 1/133* (2006.01)
*G02F 1/13363* (2006.01)
*G02F 1/29* (2006.01)
*H04N 13/04* (2006.01)
*G02F 1/1334* (2006.01)

(52) U.S. Cl.
CPC .... *G02F 1/13363* (2013.01); *G02F 1/133365* (2013.01); *G02F 1/29* (2013.01); *H04N 13/0404* (2013.01); *H04N 13/0452* (2013.01); *G02F 1/1334* (2013.01); *G02F 2001/13345* (2013.01); *G02F 2001/294* (2013.01)

(58) Field of Classification Search
CPC .. G02B 6/272; G02B 6/2773; G02B 6/29302; G02B 27/28; G02B 27/0172; G02B 27/2228; G02B 5/30; G02B 5/3025; G02B 5/3016; G02B 2027/0134; G02B 2027/0141; G02B 3/0006; H04N 13/0404; H04N 13/0454; H04N 13/0411; G02F 1/133526; G02F 1/01; G02F 1/13; G02F 1/133365; G02F 1/1334; G02F 1/1347; G02F 1/135; G02F 1/141; G02F 1/1333; G02F 1/1335; G02F 1/133362; G02F 2203/07; G02F 1/133508; G02F 1/133602; G02F 1/1393; G02F 1/13306; G02F 1/13363; G02F 1/13471; G02F 1/13781; G02F 2202/40; H04Q 11/0001; C09K 19/02
USPC .. 349/15, 194, 95, 13, 9, 88, 100, 197, 193, 349/96, 179, 172, 33, 127, 130, 117, 133; 359/463, 465, 462, 484.6, 487.04, 489.08, 359/489.14, 56; 385/11, 16, 17, 15, 18, 385/E13.029, E13.044, 51, E13.03, 385/E13.043, 42, 57, 59, 759; 353/8, 7; 345/204, 419, 697, 87, E13.044
See application file for complete search history.

(56) References Cited

U.S. PATENT DOCUMENTS

| | | | |
|---|---|---|---|
| 6,028,656 A * | 2/2000 | Buhrer | G02F 1/13471 349/117 |
| 7,250,923 B2 | 7/2007 | Taira et al. | |
| 7,345,654 B2 | 3/2008 | Taira et al. | |
| 7,532,272 B2 | 5/2009 | Woodgate et al. | |
| 7,567,307 B2 | 7/2009 | Kim et al. | |
| 7,760,430 B2 | 7/2010 | Shestak et al. | |
| 8,279,363 B2 | 10/2012 | Ge et al. | |
| 8,373,684 B2 | 2/2013 | Kim et al. | |
| 8,564,874 B2 | 10/2013 | Chen | |
| 8,582,062 B2 | 11/2013 | Kim et al. | |
| 9,052,516 B2 * | 6/2015 | Xie | G02F 1/13363 |
| 9,500,872 B2 * | 11/2016 | Boudreau | G02B 27/2214 |
| 2005/0233094 A1 * | 10/2005 | Sawatari | C09K 19/0225 428/1.1 |
| 2006/0291053 A1 * | 12/2006 | Robinson | G02B 27/2264 359/465 |
| 2011/0122370 A1 | 5/2011 | Chien | |
| 2012/0092586 A1 | 4/2012 | He et al. | |
| 2012/0320292 A1 * | 12/2012 | Guo | G02F 1/1396 349/15 |
| 2016/0161817 A1 * | 6/2016 | Sasou | C09K 19/0225 349/123 |

OTHER PUBLICATIONS

Liang, Dong, et al., "2D/3D Switchable Autostereoscopic Display Based on Polymer-Stabilized Blue-Phase Liquid Crystal Lens", *Journal of Display Technology*, vol. 8, No. 10, pp. 609-612 (2012).

Huang, Yi-Pai, et al., "Superzone Fresnel Liquid Crystal Lens for Temporal Scanning Auto-Stereoscopic Display", *Journal of Display Technology*, vol. 8, No. 11, pp. 650-655, (Nov. 2012).

Huang, Yi-Pai, et al., "2-D/3-D switchable autostereoscopic display with multi-electrically driven liquid-crystal (MeD-LC) lenses", *Journal of the SID*, 18/9, pp. 642-646, (2010).

Ren, Hongwen, et al., "Switchable focus using a polymeric lenticular microlens array and a polarization rotator", *Optics Express*, vol. 21, No. 7, (Apr. 8, 2013).

Chang, Yu-Cheng, et al., "High-resistance liquid-crystal lens array for rotatable 2D/3D autostereoscopic display", 16.*Optics Express*, vol. 22, No. 3, 2714, (Feb. 10, 2014).

* cited by examiner

2D/3D SWITCHABLE LIQUID CRYSTAL LENS UNIT

CROSS-REFERENCE TO RELATED APPLICATIONS

This patent application claims the benefit of U.S. Provisional Patent Application No. 61/996,790, filed May 16, 2014, which is incorporated by reference.

BACKGROUND

Autostereoscopic 3D display technology has become more mainstream in recent years, which may be due to the convenience of achieving 3D effects without wearing glasses. The ability to switch between 2D and 3D display modes is important to autostereoscopic 3D displays. 2D/3D switchability allows for display of 2D content that does not include any 3D content, as well as display of 2D content together with 3D content (e.g., the display of a 3D object together with a 2D text description).

SUMMARY

In an embodiment, the invention provides a 2D/3D switchable liquid crystal lens device, including: a polarization-dependent lens array, configured to provide a focusing effect for impinging light having a first plane of polarization of the impinging light and to provide no focusing effect for impinging light have a second plane of polarization orthogonal to the first plane of polarization; a switchable polarization rotating stage, comprising bi-stable liquid crystals, wherein the switchable polarization rotating stage is configured to output light having the first plane of polarization to the polarization-dependent lens array while the bi-stable liquid crystals are in a first state, and to output light having the second plane of polarization to the polarization-dependent lens array while the bi-stable liquid crystals are in a second state; and a driving system, configured to switch the bi-stable liquid crystals of the switchable polarization rotating stage between the first state and the second state.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
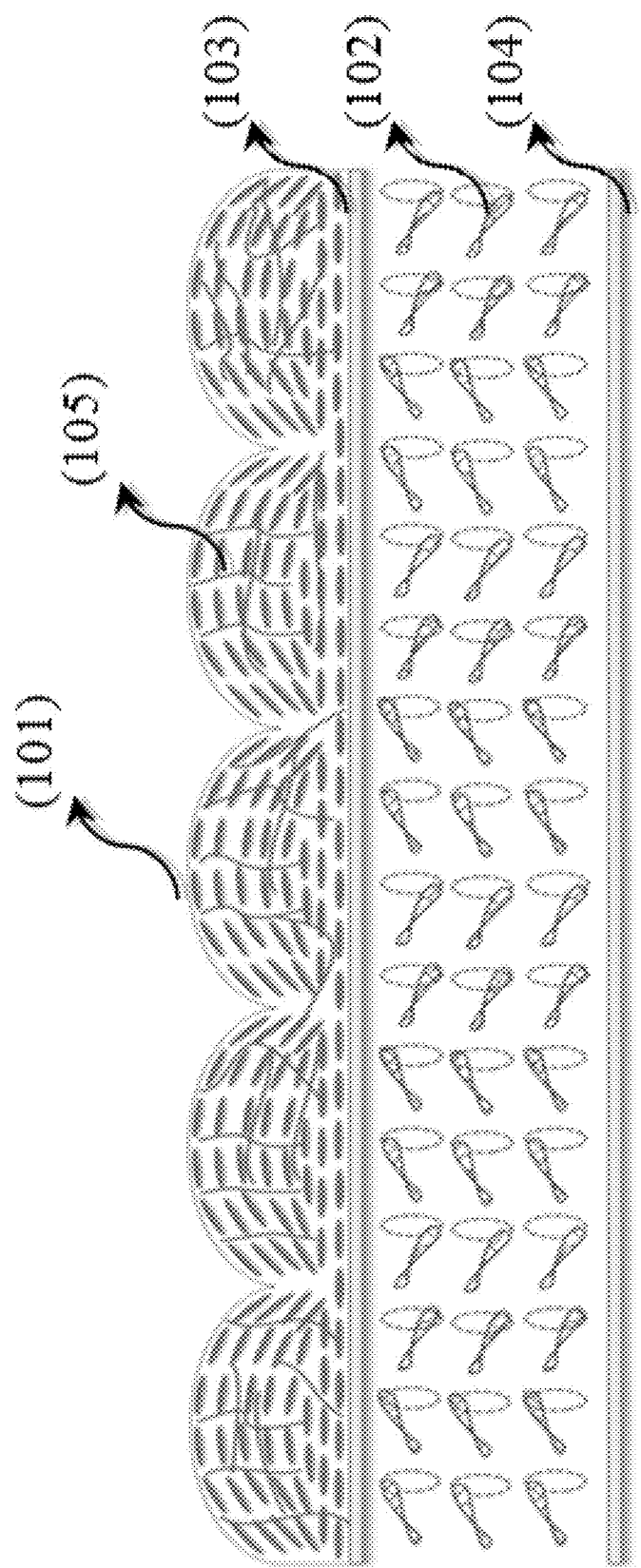
FIG. 1 is a schematic diagram of a 2D/3D switchable liquid crystal lens unit in an embodiment.

In an embodiment, the invention provides a 2D/3D switchable liquid crystal lens unit. The liquid crystal lens unit includes a polarization-dependent lens array, a switchable polarization rotating stage made of bi-stable liquid crystal, and a driving system. The lens array provides a focusing effect for one plane of polarization of impinging light, but not for impinging light having a polarization orthogonal to the one plane. The bi-stable liquid crystals in a first state do not affect the polarization status of the lens array, while in another state the bi-stable liquid crystals cause the plane of polarization to be rotated so as to be orthogonal to the polarization plane of the impinging light. This results in a lens effect in one state but not in the other state. The lens unit may be switched from one state to another using a short voltage pulse.

In an embodiment, the lens array may be made of polymer.

In an embodiment, the lens for the lens array may be produced by placing liquid crystals and a monomer composite under the action of inter-digital electric field, followed by UV exposure to polymerize a polymer network.

In an embodiment, producing the lens array may further include a photoalignment process. The photoalignment process allows for the anchoring energy to be tuned via irradiation doses, for example, irradiation doses that are sufficiently large in the range of $1\times10^{-4}$ to $5\times10-3$ J/m². This allows for a good balance to be established between different energies of the system (including, e.g., the anchoring energy and elastic energy), and prevents the appearance of defects. Thus, using photoalignment through diffusion, embodiments of the invention achieve, for example, a defect-free bi-stable FLC rotating stage. According to the diffusion process, molecules distributed in the plane start to diffuse in one direction where the energy for the absorption oscillator is minimum. This provides in-plane movement of the easy axis without any pre-tilt such that the anchoring energy is tunable via irradiation dose without generating any pre-tilt.

In an embodiment, the lens array may also be made of liquid crystal polymer, birefringent material, and/or graded-index birefringent material.

In an embodiment, producing the switchable polarization rotating stage of the lens unit may involve photoalignment of liquid crystals, rubbing alignment of liquid crystals, and/or nano-imprinted alignment of liquid crystals.

In an embodiment, the switchable polarization rotating stage may be made of bi-stable ferroelectric liquid crystals and be designed to meet a half-wave condition (which allows for rotation of the plane of the polarization of the impinging light to a certain degree, such that the polarization-dependent lens unit can be tuned between providing a lens effect and having no lens effect).

In an embodiment, the switchable polarization rotating stage may have two bi-stable optical states that correspond to different switching positions of a ferroelectric liquid crystal cone.

In an embodiment, one of the optical states does not affect the polarization state of the impinging light whereas the other optical state rotates the plane of polarization orthogonal to the plane of polarization of the impinging light.

In an embodiment, the bi-stable ferroelectric liquid crystals can be switched from the one stable optical state to the other stable optical state by the application of a voltage pulse having positive or negative polarity.

Figure 10:
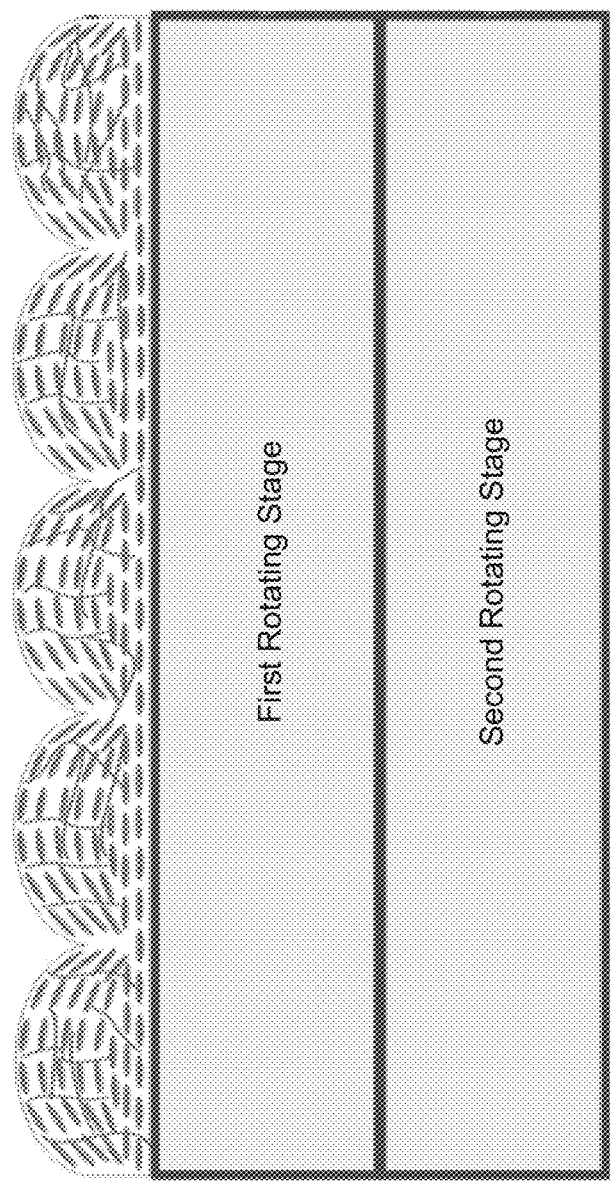
FIG. 10 is a schematic diagram of a 2D/3D switchable liquid crystal lens unit with multiple rotating stages.

In an embodiment, a 2D/3D switchable liquid crystal lens unit includes two ferroelectric liquid crystal layers (i.e., in this embodiment, the switchable polarization rotating stage includes at least two rotating stages, as shown in FIG. 10), which may be used for achromatic polarization rotating stages (i.e., white light with all wavelengths in the visible range).

In an embodiment, the polarization rotating stage may be made of bi-stable ferroelectric liquid crystals, wherein a bi-stable ferroelectric liquid crystal layer does not meet the half wave condition and a retardation compensator (e.g., a thin-film phase compensator) is used to maintain the polarization state.

In an embodiment, the polarization rotating stage may be made of bi-stable nematic liquid crystals.

In an embodiment, two nematic liquid crystal layers may be used for the achromatic polarization rotating stages.

In an embodiment, a retardation compensator may be used to maintain desired polarization conditions.

In an embodiment, the liquid crystal lens unit can be used to selectively display 3D and 2D content on a liquid crystal display (LCD) panel.

In general, embodiments of the invention provide 2D/3D switchable liquid crystal lens units that do not need constant application of power to be operated in either 2D or 3D display modes. This is achieved by utilizing a bi-stable polarization rotation stage and polarization-dependent passive lens. Switching between the 2D and 3D display modes can be accomplished by the application of a short voltage pulse of different polarity with extremely fast response times (approximately an order of magnitude smaller than conventional systems). Further, embodiments of the invention provide better features, easier manufacturing, and minimal power consumption.

Typically, the use of bi-stable ferroelectric liquid crystals (FLCs) does not provide uniform optical quality due to the scattering effects of undesirable domains within the FLCs. However, with respect to embodiments of the present invention, photoalignment is used to suppress the unwanted domains and to achieve relatively uniform alignment quality. As discussed above, the photoalignment allows for good control of the anchoring energy, which enables FLC defect domains to be avoided. With respect to photoalignment material that requires precise tuning of the anchoring energy via irradiation doses, or requires layer thickness with almost zero pre-tilt angle, a diffusion process is used.

FIG. 1 illustrates an exemplary embodiment of a 2D/3D switchable liquid crystal lens unit for autostereoscopic display. Specifically, element 101 represents a polarization-dependent lens, element 102 represents a bi-stable polarization rotating stage (in this exemplary embodiment it is made of bi-stable ferroelectric liquid crystals). Elements 103 and 104 are conducting electrodes that provide for switching of the bi-stable polarization rotating stage from one stable state to another stable state. Element 105 is a polymer network for stabilizing the lens profile of the polarization-dependent lens 101.

The 2D/3D switchable liquid crystal lens unit depicted in FIG. 1 includes two stages. A first stage is the polarization plane rotation stage that is a bi-stable liquid crystal panel. On application of different voltage pulses (e.g., a positive voltage pulse versus a negative voltage pulse), this stage provides switching between two different stable states, wherein the first state rotates the plane of polarization of the impinging light orthogonally while the other state does not affect the impinging light.

Figure 3:
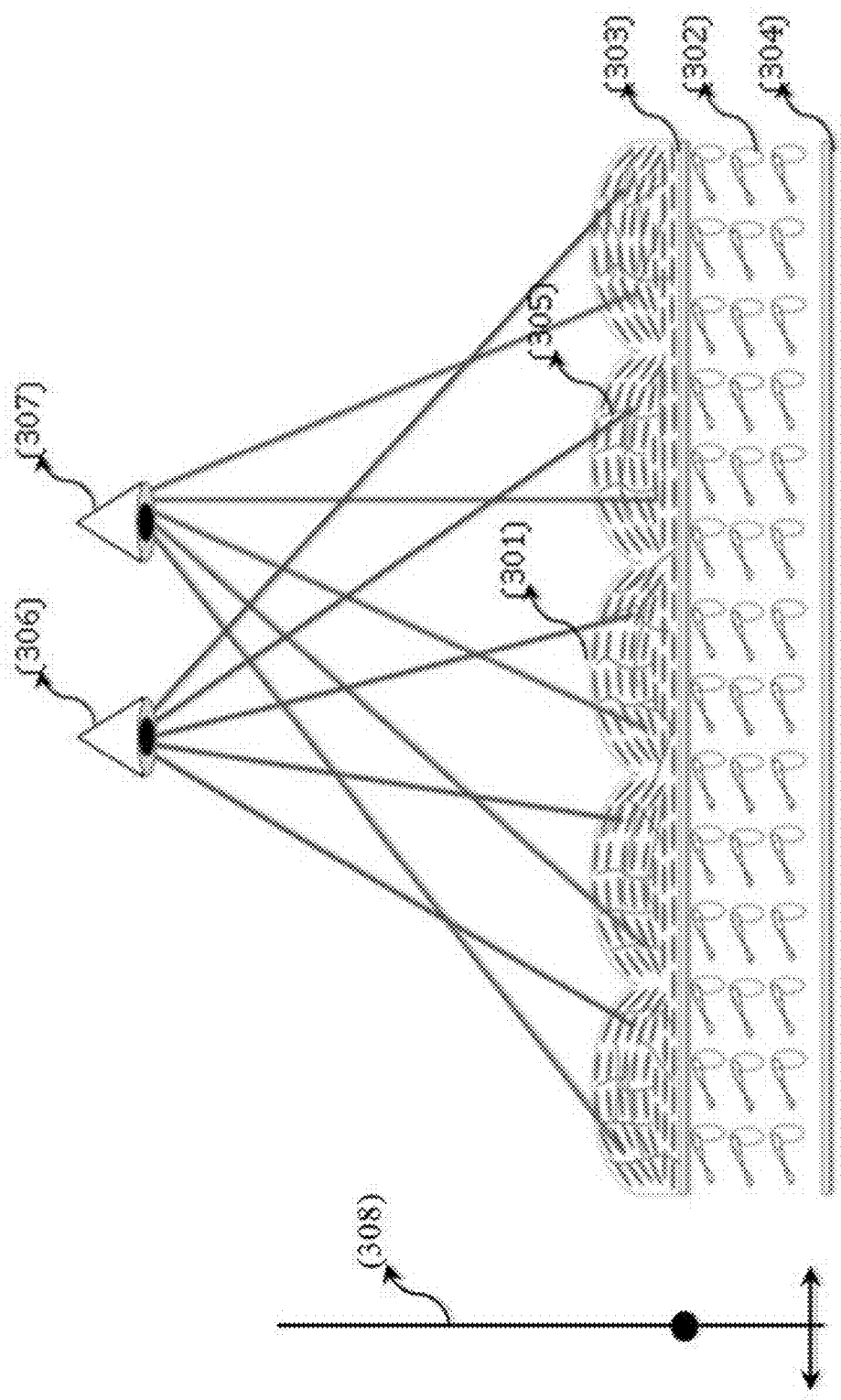
FIG. 3 illustrates a 2D/3D switchable liquid crystal lens unit in operation with respect to 3D content in an embodiment.

The second stage of the 2D/3D switchable liquid crystal lens unit is the polarization-dependent lens array. This lens arrays provides a lens profile only for one plane of polarization, and focuses light directly in the eye of the observer to provide for 3D content. FIG. 3 illustrates the lens unit in operation with respect to 3D content. Element 301 represents the polarization dependent lens. Element 302 represents the bi-stable polarization rotating stage. Elements 303 and 304 are the conducting electrodes. Element 305 is the polymer network to stabilize the lens profile of the polarization dependent lens. Elements 306 and 307 represent the eyes of an observer. Element 308 shows the working principle where the plane of linearly polarized light (↔) has been rotated orthogonally (•) by the bi-stable polarization rotating stage. This causes light to be focused to the different eyes of the observer by the polarization-dependent lens, which allows for the perception of displayed content in a three-dimensional form by the observer.

Figure 5:
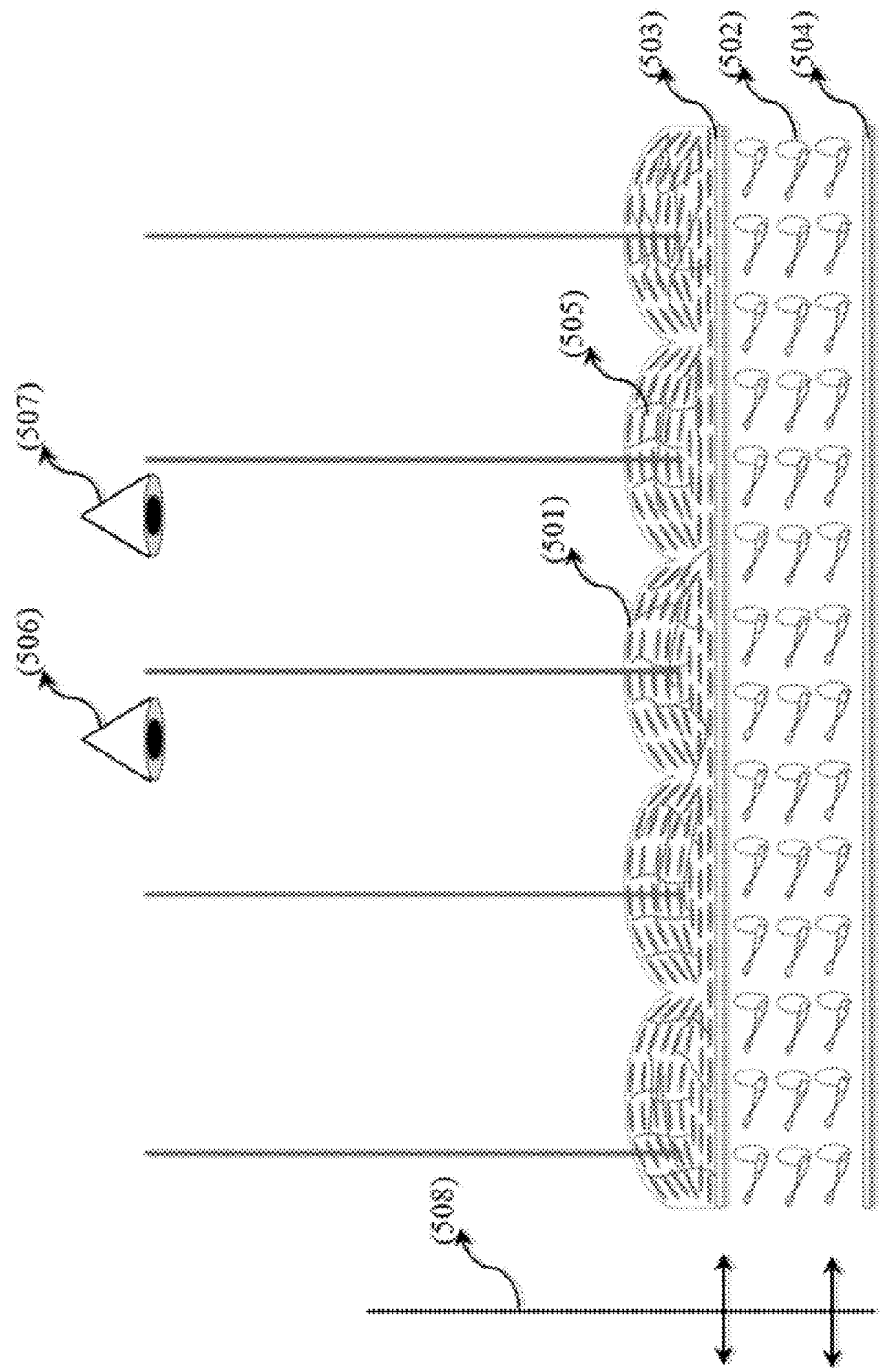
FIG. 5 illustrates a 2D/3D switchable liquid crystal lens unit in operation with respect to 2D content in an embodiment.

To provide 2D content to an observer, the other plane of polarization (which does not exhibit any lens effect) is utilized. FIG. 5 illustrates the lens unit in operation with respect to 2D content. Element 501 represents the polarization-dependent lens. Element 502 represents the bi-stable polarization rotating stage. Elements 503 and 504 are the conducting electrodes. Element 505 is the polymer network. Elements 506 and 507 represent the eyes of an observer. Element 508 shows the working principle where the plane of linearly polarized light (↔) has not been affected by the bi-stable polarization rotating stage. Thus, the polarization-dependent lens does not provide a lens profile here. This allows the observer to perceive the displayed content in a two-dimensional form.

The polarization-dependent lens array is a passive element that may be fabricated in different ways (e.g., using an electric field, using mechanical dye, or using a magnetic field). In the examples depicted in FIGS. 1, 3 and 5, the polarization-dependent lens array is made of a polymer-stabilized liquid crystal film fabricated by the application of an inter digital electric field followed by polymer stabilization in the presence of the applied electric field.

On the other hand, the bi-stable polarization rotating stage is an active element. Transparent electrodes are provided to switch the stage from one state to the other.

In a first aspect of an exemplary embodiment, the invention provides a 2D/3D switchable liquid crystal lens unit that operates in either a 2D or 3D regime. The unit switches between the two regimes based on control of the bi-stable polarization plane rotation stage.

In a second aspect of an exemplary embodiment, the invention provides a 2D/3D switchable liquid crystal lens unit having a bi-stable polarization plane rotation stage that is a bi-stable liquid crystal panel. The panel may be made of any bi-stable liquid crystal electro-optical modes. In one example, as depicted in FIGS. 1, 3 and 5, the panel is made of a bi-stable ferroelectric liquid crystal layer sandwiched between the transparent electrodes. This bi-stable polarization plane rotation stage shows two states: first, where the optics axis of the bi-stable ferroelectric liquid crystals aligned with the impinging light; and second, where it is shifted from the plane of polarization of the impinging light by a certain angle to provide a certain polarization plane rotation.

Figure 4:
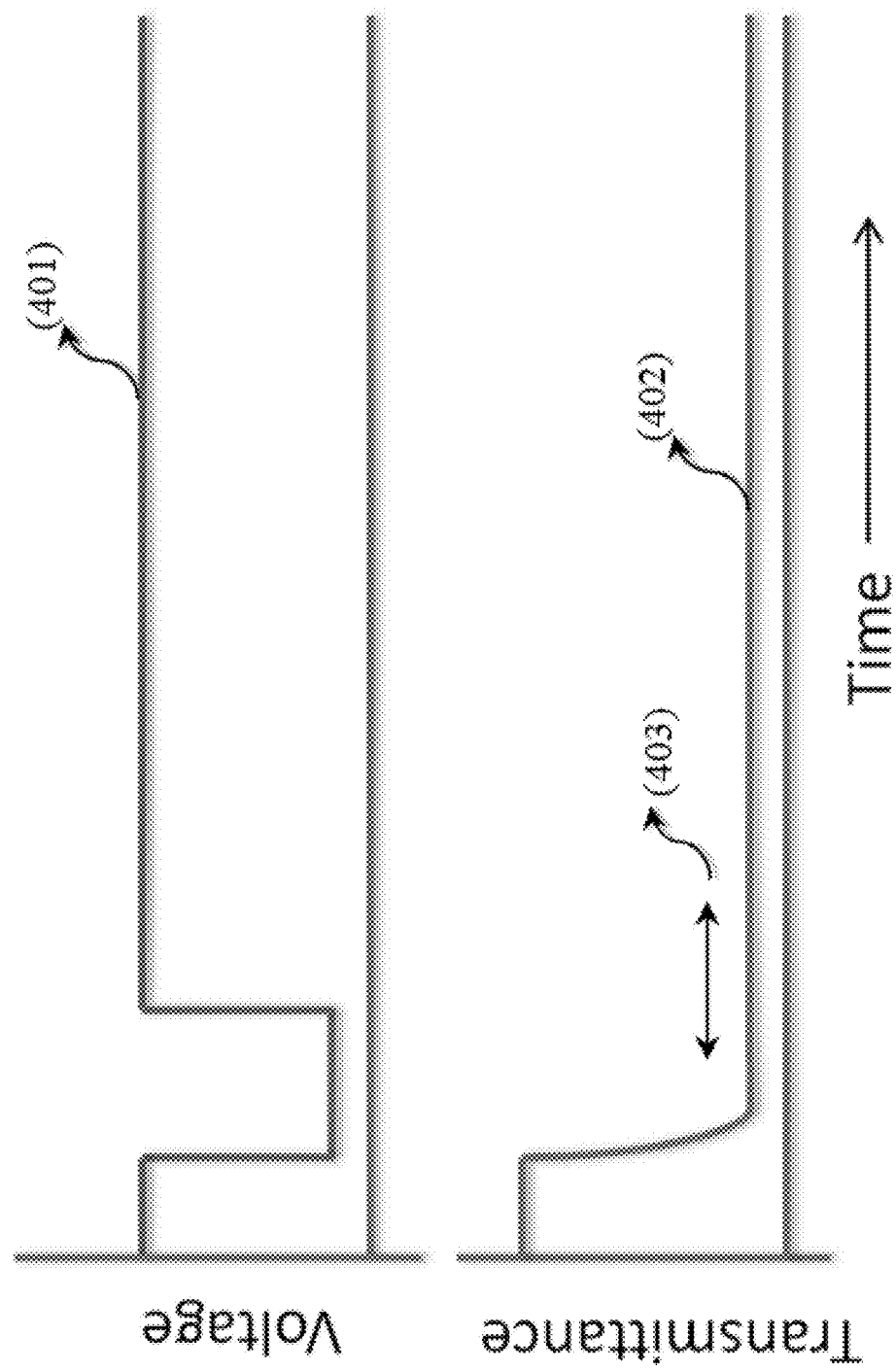
FIG. 4 is a plot illustrating transmittance relative to a corresponding voltage pulse.

In a third aspect of an exemplary embodiment, the invention provides for switching between two states of the bi-stable polarization plane rotation stage based on application of a positive voltage pulse (see FIG. 2) or with a negative voltage pulse (see FIG. 4). For example, in one state, the 2D/3D switchable liquid crystal lens unit is able to display 3D content, and after the bi-stable polarization rotating stage is switched to the other state, the unit is able to display 2D content. Power is not required to hold the bi-stable polarization plane rotation stage in the state it is switched to.

Figure 2:
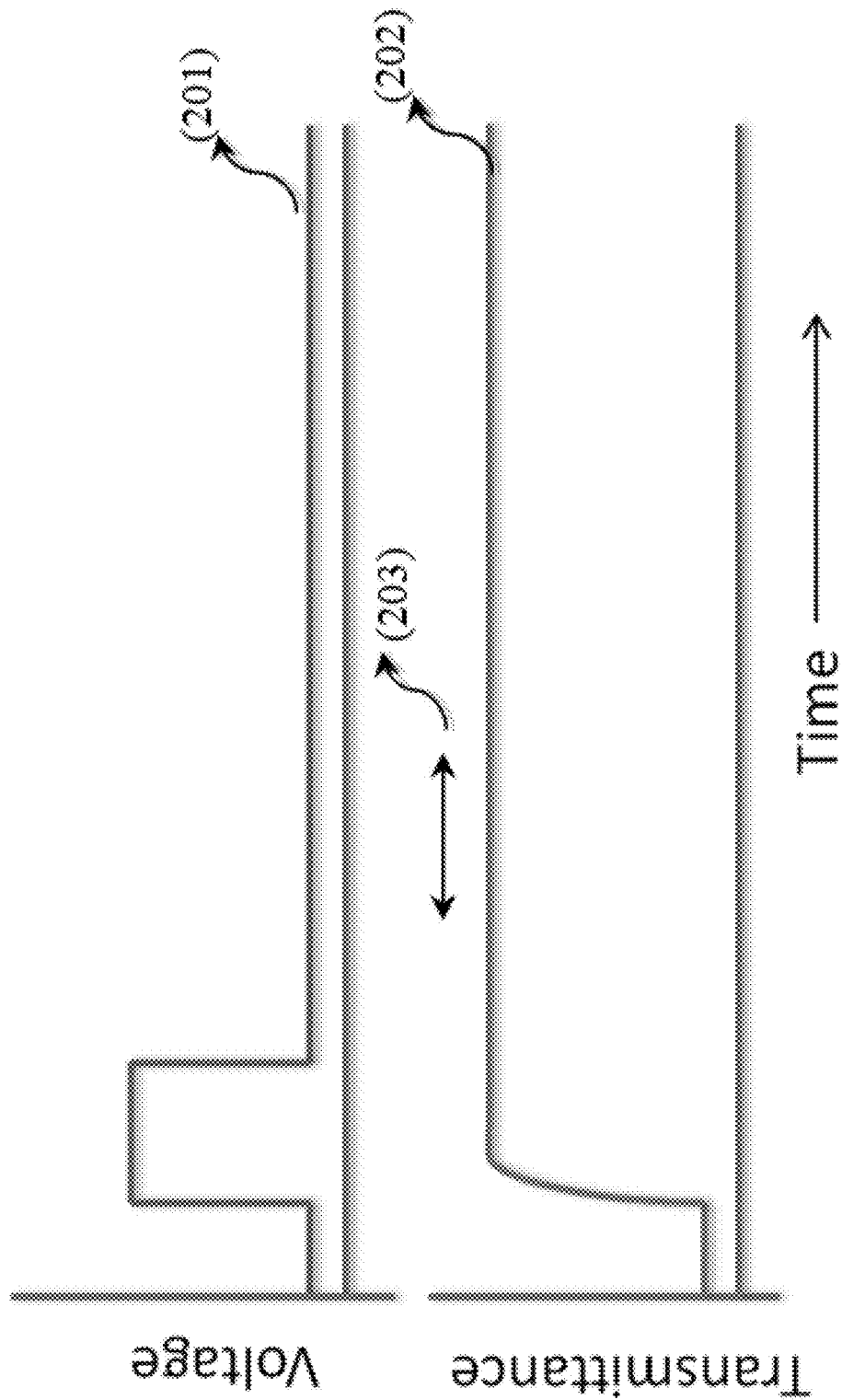
FIG. 2 is a plot illustrating transmittance relative to a corresponding voltage pulse.

Specifically, FIG. 2 is a plot illustrating the electro-optical performance of a bi-stable polarization rotating stage over time with respect to application of a voltage pulse. Element 201 represents a voltage pulse applied to a bi-stable polarization rotating stage and element 202 represents a corresponding transmittance profile of the linearly polarized light. Element 203 represents the plane of the polarization of the polarized light.

FIG. 4 similarly is a plot illustrating the electro-optical performance of the bi-stable polarization rotating stage over time with respect to application of a voltage pulse. FIG. 4 shows the application of a voltage pulse of opposite polarity relative to the voltage pulse shown in FIG. 2. Element 401 represents the voltage pulse applied to the bi-stable polarization rotating stage and element 402 represents a corresponding transmittance profile of the linearly polarized light. Element 403 represents the plane of the polarization of the linearly polarized light.

In an exemplary embodiment, a 2D/3D switchable liquid crystal lens unit can be utilized in a state that includes both 2D parts and 3D parts, so as to simultaneously provide for the display of 2D and 3D content on different areas of a display in a flexible manner. This may be accomplished by controlling a plurality of the patterned transparent conducting electrodes to switch the bi-stable polarization rotating stage into one state in one area and into the other state in another area.

Figure 6:
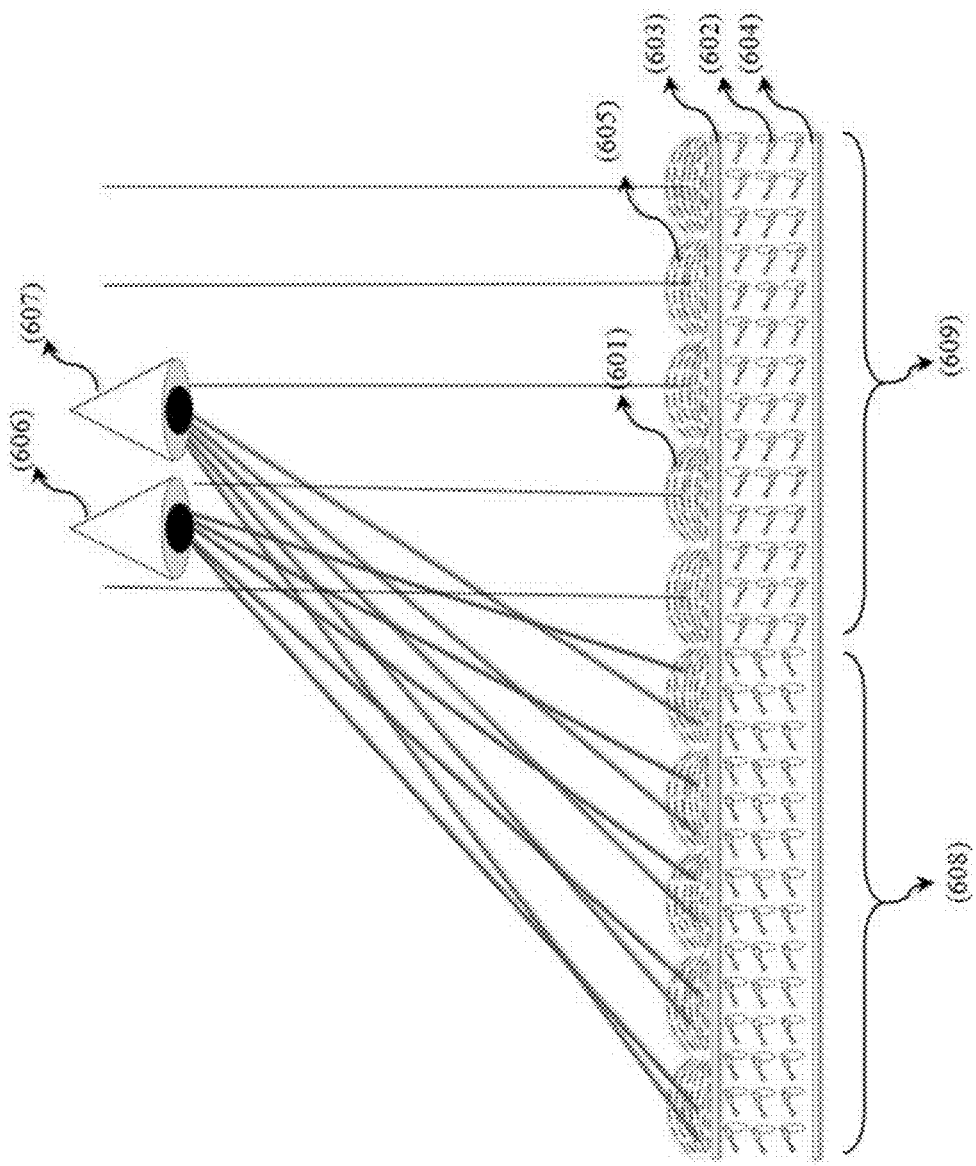
FIG. 6 illustrates a 2D/3D switchable liquid crystal lens unit in operation with respect to simultaneous display of 2D and 3D content in an embodiment.

FIG. 6 illustrates a lens unit in operation with respect to simultaneous display of 2D content and 3D content in different areas. Element 601 represents the polarization-dependent lens. Element 602 represents the bi-stable polarization rotating stage. Elements 603 and 604 are conducting electrodes. Element 605 is a polymer network. Elements 606 and 607 represent the eyes of an observer. Elements 608 and 609 represent 3D and 2D areas of the display, respectively. The operation of the display in the 3D area 608 is similar as discussed above with respect to FIG. 3. The operation of the display in the 2D area 609 is similar as discussed above with respect to FIG. 5.

Figure 7:
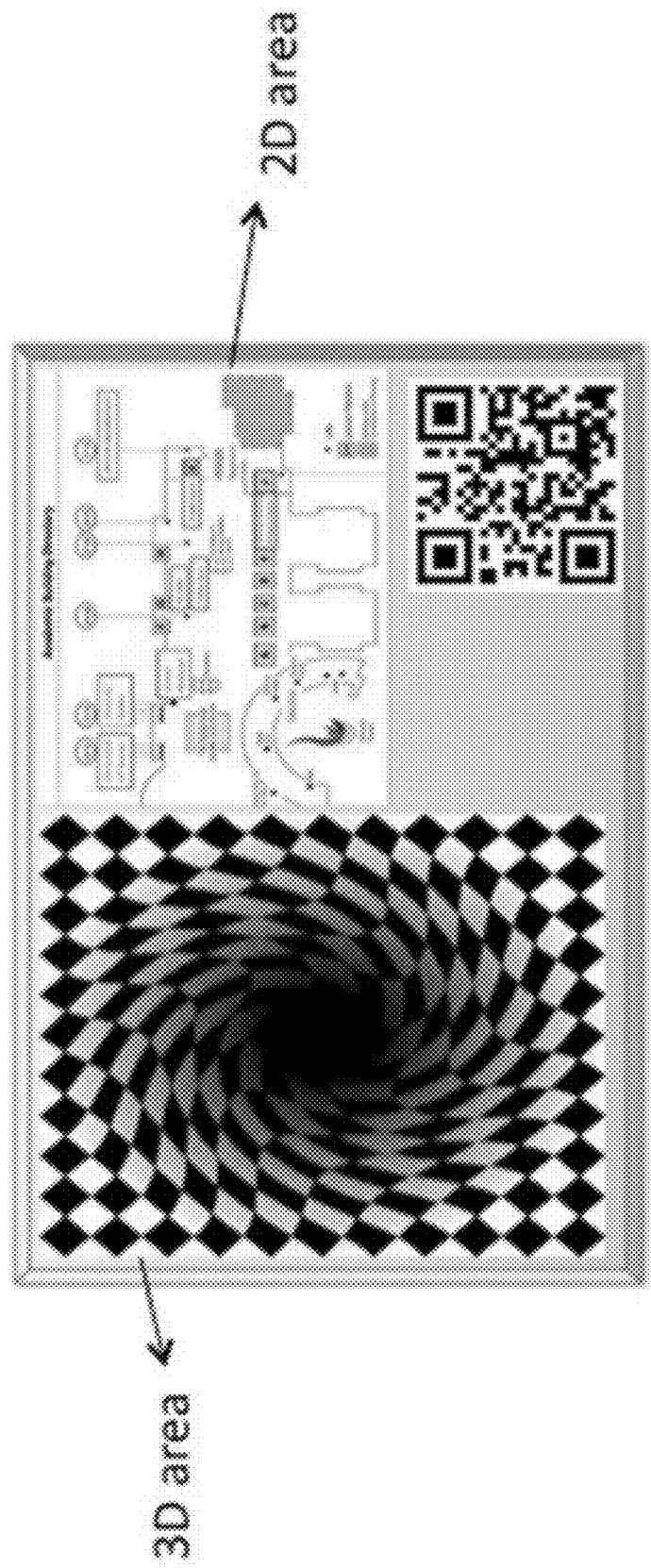
FIG. 7 illustrates exemplary 2D and 3D content being simultaneously displayed in an embodiment.

FIG. 7 illustrates an example of 3D and 2D content that may be shown using the lens unit of FIG. 6. On the left side of the display, 3D content is shown, and on the right side of the display, 2D content is shown.

In another exemplary embodiment, the lens unit further includes a retardation film positioned between the polarization-dependent lens and bi-stable polarization plane rotation stage. This retardation film can compensate for chromatic dispersion and retardation associated with the liquid crystal material.

Figure 8:
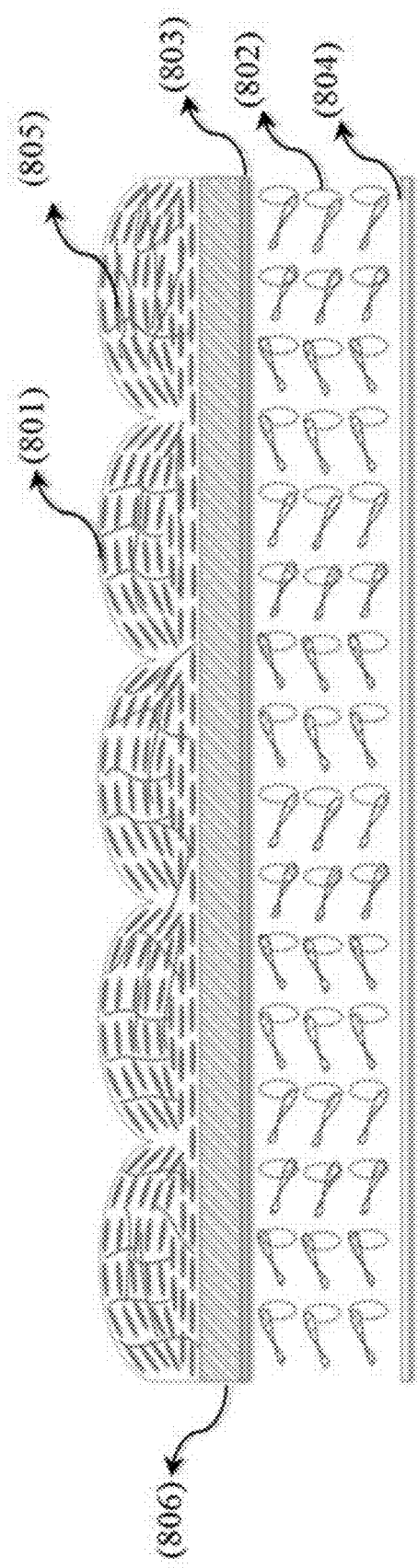
FIG. 8 is a schematic diagram of a 2D/3D switchable liquid crystal lens unit with a retardation film in an embodiment.

FIG. 8 is a schematic diagram of a 2D/3D switchable liquid crystal lens unit having such a retardation film. Element 801 represents the polarization-dependent lens. Element 802 represents the bi-stable polarization rotating stage. Elements 803 and 804 are the conducting electrodes for switching the bi-stable polarization rotating stage from one stable sate to another stable state. Element 805 is the polymer network for stablizing the lens profile of the polarization-dependent lens. Element 806 is the retardation compensation film.

Figure 9:
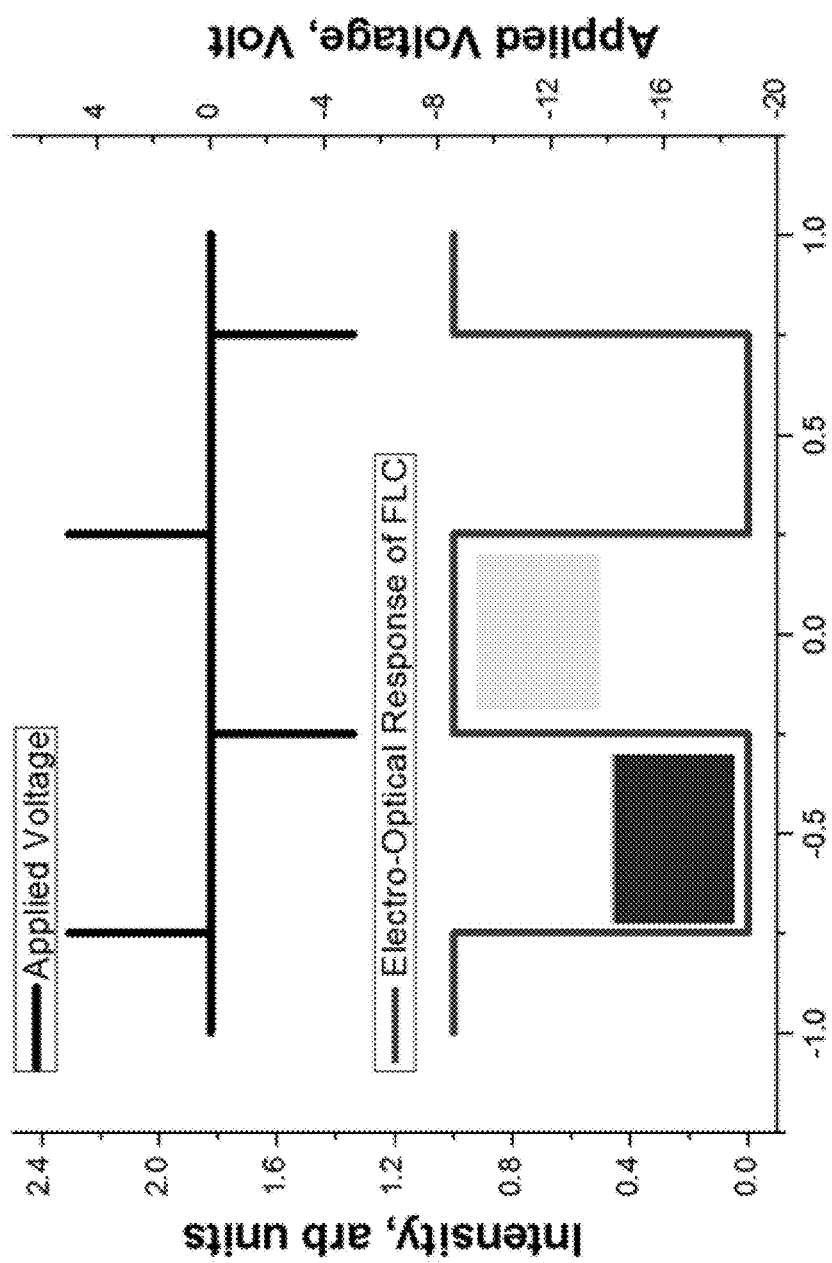
FIG. 9 is an exemplary plot of applied voltage and electro-optical response for an exemplary device.

In embodiments of the invention, bi-stable ferroelectric liquid crystal can be switched from one state to another to rotate the plane of polarization of impinging light from a direction where the polarization dependent lens array does not show a lens effect to a direction where the lens array shows a lens effect (or vice versa). A voltage pulse with sufficiently high magnitude and time duration (e.g., 5V with duration of 200 μs) is sufficient to switch the bi-stable ferroelectric liquid crystals from one state to other. The response time of the bi-stable ferroelectric liquid crystal with such voltage pulse is approximately 150 μs, and it will be appreciated that the response time may vary based on the material parameters and the magnitude of the applied voltage. As depicted in FIG. 9, which is an exemplary plot of applied voltage and electro-optical response over time for an exemplary device, no holding voltage is required after the pulse is applied to maintain whichever state the bi-stable ferroelectric liquid crystal was switched to. Advantages of embodiments of the invention thus include bi-stable operation, low driving voltage, and quick response time.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A 2D/3D switchable liquid crystal lens device, comprising:
a polarization-dependent lens array, configured to provide a focusing effect for impinging light having a first plane of polarization and to provide no focusing effect for impinging light have a second plane of polarization orthogonal to the first plane of polarization;
a switchable polarization rotating stage, comprising photoaligned bi-stable ferroelectric liquid crystals having anchoring energy balanced with elastic energy based on tuning of the anchoring energy via diffusion photoalignment, wherein the switchable polarization rotating stage is configured to output light having the first plane of polarization to the polarization-dependent lens array while the photoaligned bi-stable ferroelectric liquid crystals are in a first stable state, and to output light having the second plane of polarization to the polarization-dependent lens array while the photoaligned bi-stable ferroelectric liquid crystals are in a second stable state; and
a driving system, configured to apply voltage pulses to switch the photoaligned bi-stable ferroelectric liquid crystals of the switchable polarization rotating stage between the first stable state and the second stable state, wherein power is not required to hold the photoaligned bi-stable ferroelectric liquid crystals in the first state and the second state after switching;
wherein the switchable polarization rotating stage is configured to meet a half-wave condition; and
wherein the photoaligned bi-stable ferroelectric liquid crystals in the first state do not affect the polarization state of light input to the switchable polarization rotating stage, and the photoaligned bi-stable ferroelectric liquid crystals in the second state orthogonally rotates the plane of polarization of light input to the switchable polarization rotating stage.

2. The 2D/3D switchable liquid crystal lens device according to claim 1, wherein the polarization-dependent lens array is made of polymer.

3. The 2D/3D switchable liquid crystal lens device according to claim 1, wherein the polarization-dependent lens array includes liquid crystals and a polymer network.

4. The 2D/3D switchable liquid crystal lens device according to claim 1, wherein the polarization-dependent lens array is based on a photoalignment process.

5. The 2D/3D switchable liquid crystal lens device according to claim 1, wherein the polarization-dependent lens array comprises liquid crystal polymer.

6. The 2D/3D switchable liquid crystal lens device according to claim 1, wherein the polarization-dependent lens array comprises birefringent material.

7. The 2D/3D switchable liquid crystal lens device according to claim 1, wherein the polarization-dependent lens array comprises graded index birefringent material.

8. The 2D/3D switchable liquid crystal lens device according to claim 1, wherein the driving system is configured to apply voltage pulses having positive and negative polarities to perform the switching.

9. The 2D/3D switchable liquid crystal lens device according to claim 1, wherein the switchable polarization rotating stage comprises multiple rotating stages, including two ferroelectric liquid crystal layers.

10. The 2D/3D switchable liquid crystal lens device according to claim 1, wherein the switchable polarization rotating stage is configured to provide a first region having photoaligned bi-stable ferroelectric liquid crystals in the first state and a second region having photoaligned bi-stable ferroelectric liquid crystals in the second state, such that the 2D/3D switchable liquid crystal lens device is configured to facilitate simultaneous display of 2D content with 3D content.

11. A 2D/3D switchable liquid crystal lens device, comprising:
a polarization-dependent lens array, configured to provide a focusing effect for impinging light having a first plane of polarization and to provide no focusing effect for impinging light have a second plane of polarization orthogonal to the first plane of polarization;
a switchable polarization rotating stage, comprising photoaligned bi-stable ferroelectric liquid crystals having anchoring energy balanced with elastic energy based on tuning of the anchoring energy via diffusion photoalignment, wherein the switchable polarization rotating stage is configured to output light having the first plane of polarization to the polarization-dependent lens array while the photoaligned bi-stable ferroelectric liquid crystals are in a first stable state, and to output light having the second plane of polarization to the polarization-dependent lens array while the photoaligned bi-stable ferroelectric liquid crystals are in a second stable state;
a driving system, configured to apply voltage pulses to switch the photoaligned bi-stable ferroelectric liquid crystals of the switchable polarization rotating stage between the first stable state and the second stable state, wherein power is not required to hold the photoaligned bi-stable ferroelectric liquid crystals in the first state and the second state after switching; and
wherein the switchable polarization rotating stage is not configured to meet a half-wave condition, and wherein the 2D/3D switchable liquid crystal lens device further comprises a retardation compensator;
wherein the photoaligned bi-stable ferroelectric liquid crystals in the first state do not affect the polarization state of light input to the switchable polarization rotating stage, and the photoaligned bi-stable ferroelectric liquid crystals in the second state, in combination with the retardation compensator, orthogonally rotates the plane of polarization of light input to the switchable polarization rotating stage.

* * * * *